United States Patent
Chung et al.

(10) Patent No.: US 6,615,093 B1
(45) Date of Patent: Sep. 2, 2003

(54) ADAPTIVE CONTROL ALGORITHM FOR IMPROVING AMHS PUSH LOT ACCURACY

(75) Inventors: Ming-Hsun Chung, Taoyuan (TW); Hung-I Chen, Changhua (TW); Wen-Cheng Chin, Hsinchu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 10/037,585

(22) Filed: Jan. 4, 2002

(51) Int. Cl.[7] ................................ G06F 19/00
(52) U.S. Cl. .................. 700/100; 700/101; 700/121; 700/29
(58) Field of Search ............... 700/100, 99, 101, 700/102, 114, 115, 121, 28, 29

(56) References Cited

U.S. PATENT DOCUMENTS

| | | | |
|---|---|---|---|
| 5,282,139 A | * 1/1994 | Kobayashi | 700/101 |
| 5,311,421 A | 5/1994 | Nomura et al. | 364/157 |
| 5,432,887 A | 7/1995 | Khaw | 395/11 |
| 5,619,695 A | 4/1997 | Arbabi et al. | 395/670 |
| 5,845,258 A | 12/1998 | Kennedy | 705/8 |
| 5,930,137 A | * 7/1999 | Togashi | 700/100 |
| 6,055,533 A | 4/2000 | Hogge | 707/7 |
| 6,128,588 A | * 10/2000 | Chacon | 700/102 |
| 6,308,107 B1 | * 10/2001 | Conboy et al. | 700/99 |
| 6,459,949 B1 | * 10/2002 | Black et al. | 700/99 |

* cited by examiner

Primary Examiner—Albert W. Paladini
(74) Attorney, Agent, or Firm—George O. Saile; Stephen B. Ackerman

(57) ABSTRACT

A self-adjusting prediction system that provides for the transmission and storage of push lots of work. It uses an adaptive control algorithm in it's methodology to improve Automated Material Handling Systems (AMHS) transmissions. The method of prediction is greatly enchanted to reduce overall cycle time, incorrect transmission of work lots, and idle manufacturing tools. It provides real-time updating that enables a complex manufacturing Fab to process work with optimum movement between tools.

20 Claims, 6 Drawing Sheets

| PROCESS STEP (420) | ROUTE (450) | HIT RATIO (460) |
|---|---|---|
| 1 | START → A | 50% |
| 2 | A → B | 60% |
| 3 | B → D | 75% |
| 4 | D → D | 85% |
| COMPLETE | D → FINISH | 100% |

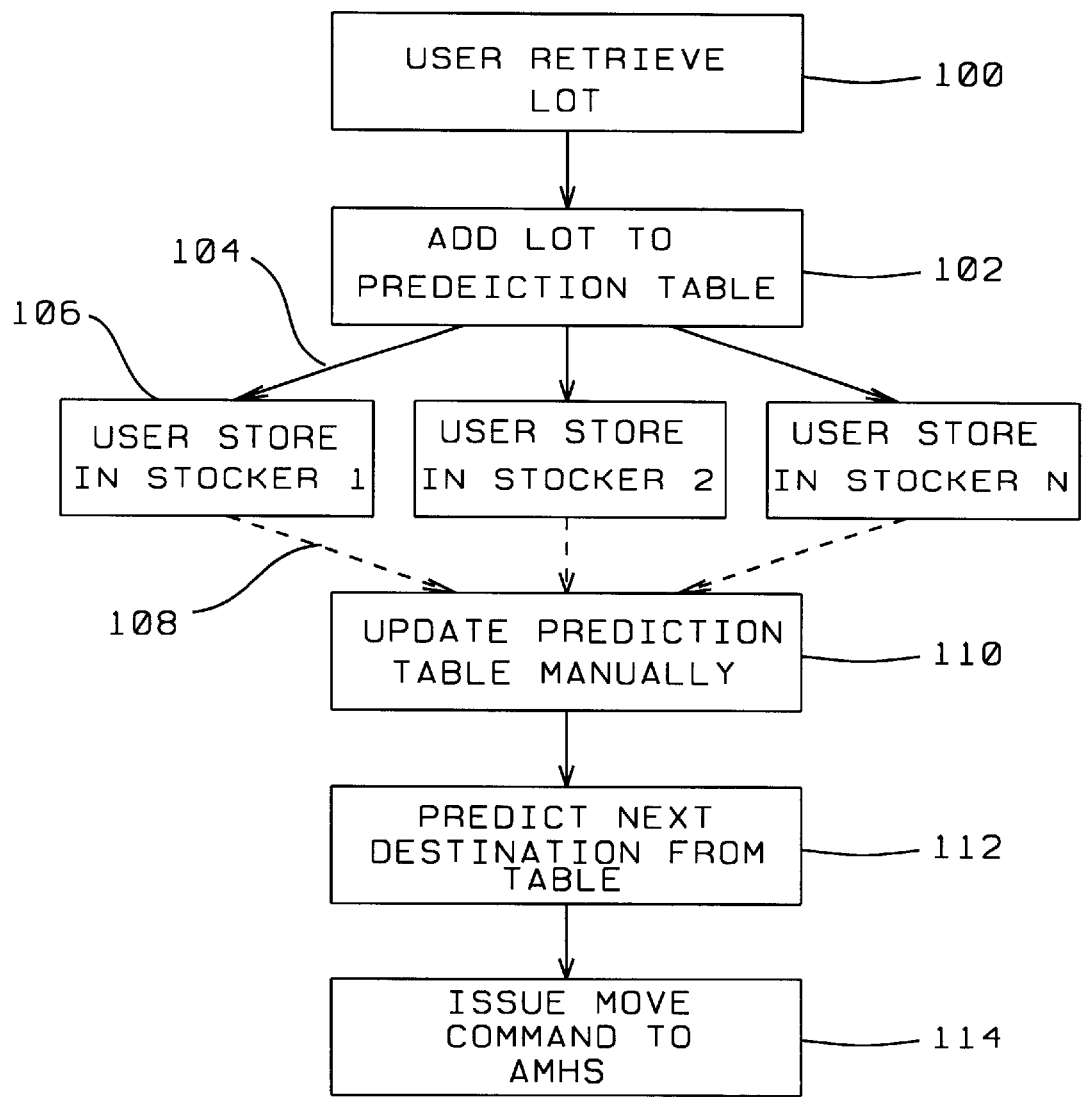
FIG. 1 — Prior Art

TOOL CAPABILITY

| TOOL/STOCKER | CAPABILITY |
|---|---|
| A | M,N |
| B | N |
| C | O,P |
| D | M,O,P |

PROCESS STEPS REQUIREMENTS

| PROCESS STEP | REQUIRED CAPABILITY |
|---|---|
| 1 | M |
| 2 | N |
| 3 | O |
| 4 | P |

*FIG. 4B*

| PROCESS STEP | ROUTE | HIT RATIO |
|---|---|---|
| 1 | START → A | 50% |
| 2 | A → B | 60% |
| 3 | B → D | 75% |
| 4 | D → D | 85% |
| COMPLETE | D → FINISH | 100% |

*FIG. 4C*

| PROCESS STEP | ROUTE | HIT RATIO |
|---|---|---|
| 1 | START → D | 95% |
| 2 | D → A | 80% |
| 3 | A → C | 50% |
| 4 | C → D | 90% |
| COMPLETE | D → FINISH | 100% |

*FIG. 4D*

ADAPTIVE CONTROL ALGORITHM FOR IMPROVING AMHS PUSH LOT ACCURACY

BACKGROUND OF THE INVENTION

1. Field of Invention

This invention relates generally to Automated Material Handling Systems (AMHS) and, more particularly, to control systems that predict accurate transmission and storage paths for transportation of material in an manufacturing Integrated Circuit (IC) manufacturing foundry.

2. Description of Related Art

A typical IC manufacturing foundry, or Fab, has a control system, AMHS, that provides for the transmission of the product wafers from one manufacturing point to another. Accurate transmission positively affects the time in which lots are processed and the overall wafer lot processing cycle time. These AMHS control systems run complex manufacturing lines. Constant changes in product and various process flows is can create problems. A change in manufacturing strategy because of market conditions is an added complication that can add to the problems.

AMHS tools help control work lot transmission and storage during processing in a Fab. Typically, there are no means in place to predict an optimum tool destination the lot should be at for best cycle time through the Fab. When tool destinations are not accurate, another transmission must be preformed manually to take the lot to the correct station, or stocker, for it's next processing. A manufacturing person must physically move the lot from the incorrect stocking area to the correct one. This results in a significant loss of time and the reduction of productivity for the entire Fab line. Furthermore, with a work lot at an incorrect destination there is the probability of the correct tool being idle while that particular lot is unavailable.

Several methods or systems related to manufacturing scheduling and process control are available. In U.S. Pat. No. 5,432,887 (Khaw) a neural network system and method for factory scheduling is described. In U.S. Pat. No. 5,619, 695 (Arbabi et al.) a method and apparatus for scheduling resources is described. In U.S. Pat. No. 5,845,258 (Kennedy) a strategy driven planning system is provided. In U.S. Pat. No. 6,055,533 (Hogge) a software system utilizing a filtering priority queue is described. Finally, in U.S. Pat. No. 5,311,421 (Nomura et al.) a process control method by use of a neural network is described.

An AMHS with optimum destination prediction control (which would place work lots in there right place at the right time) is needed to reduce both work lot cycle time and costs due to idle tools.

SUMMARY OF THE INVENTION

This invention's overall objective is to provide a flow control process that can predict their optimum transmission path for work lots to their next work position. This significantly reduces the turn around time for processing in a complex manufacturing process such as a wafer Fab line.

A second more specific objective is to provide a Structured Queuing Language (SQL) algorithm that can determine the key information to retrieve for generation of optimized transmission and storage instructions for manufacturing. Additionally, this SQL algorithm sorts history records retrieved from the AMHS so that are they can be more easily used to optimize the prediction control process.

An additional objective is to retrieve the history records on a continuous basis in order to quickly adapt the system according to recent past behavior. This can be thought of as a learning stage for the new method. The retrieval of past records is key to this prediction method and is used continuously along the Fab line to increase accuracy.

An additional objective is to collect the time stamps, location, stage, too capability, and next required tool capability of each lot porcessed in order to adapt the current Fab activity. This is another method of improving the prediction as the Fab line continues operation.

Another objective is to run a stored programming procedure that analyzes current activity on the Fab and from that develops the lot distribution table of successful hit ratios for manufacturing transmissions. This table is the routing of the optimum paths for the work lots to take between tool stockers and contains the calculated hit ratios of successful moves. It also takes into account current activity so that incorrect destinations and thus loss of time are greatly reduced.

These objectives are achieved by the method of this invention. Through the analysis of past and current data contained in the AMHS, the running stored procedure is able in real time to provide accurate predictions of the proper movement of work lots. This eliminates the need for manual intervention to move the work lots to the correct tool destination.

BRIEF DESCRIPTION OF THE DRAWINGS

This invention will be described with reference to the accompanying drawings, wherein:

FIG. 1 is a flow diagram of the original way lot control is processed in prior art.

FIG. 4B is a table showing example process steps and the required capability.

FIG. 4C is a table with examples of the processing and routes with their hit ratios, and FIG. 4D is another table with different examples of processing and routes with their hit ratios.

DETAILED DESCRIPTION OF THE PREFERRED EMBODIMENT

Figure 2A:
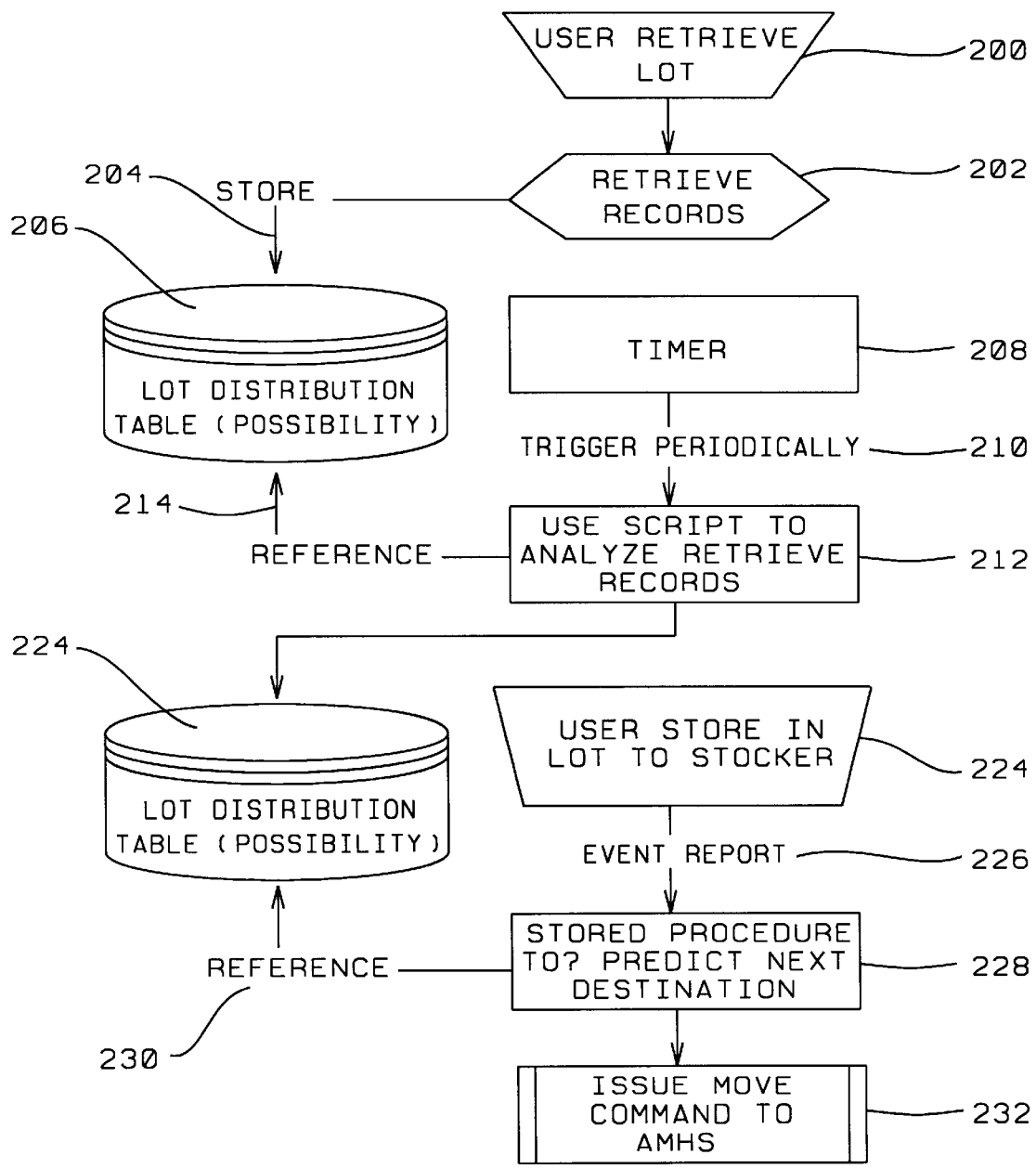
FIG. 2A is a system flow diagram of the new method.

FIG. 1 shows a flow diagram of the original way that flow control has been archived in prior art. In a wafer manufacturing Fab, a work lot is received to either begin or continue it's processing 100. A table is manually updated and maintained containing the status of all lots and shows their current process and the next processing required. Included are their timestamps, locations, and capabilities. Using this table, a decision is made as to which path the work lot should take to the next tool 102 based on past experience with like lots. The table is updated periodically and a percentage is calculated showing manufacturing personnel the best path to move the lot along for optimum processing to continue. The AMHS is updated with this extrapolated information so that it can issue the move commands that will move the lot to the next required process.

The lot is then transported to the stocker 106 to await process by the next tool. If this tool is too busy, not working, or cannot do the proper processing, the lot must be manually moved to another stocker causing considerable delay. This is not an uncommon occurrence.

Once a process is completed 108 the table is manually updated with the new information. The table is periodically recalculated again 110. The AMHS is updated with the extrapolated information 112 and the AMHS issues the move commands 114 for subsequent lots that require the same processing. The accuracy of the AMHS increases the more frequently the table and thus the AMHS are be updated. The costs associated with maintaining this information in a real-time environment also increase with more frequent updates.

FIG. 2A. shows a flow diagram of the method of the invention to improve the predictability of AMHS push lot accuracy. The manufacturing personnel receive the lot as before 200. The first major change in the process is that real-time records are now used in the AMHS to aid in the prediction of transmissions. A record is created for each lot processed 202 to be used by the AMHS data base. This record is called a lot retrieve record 204 and contains the timestamp, location, stage capability, and the capability of the next procedure. It is stored in a retrieve history file 206 it is continually updated by the AMHS as each process of the lot is completed. These retrieve records become the history that is referenced 214 by a new automated process.

Figure 2B:
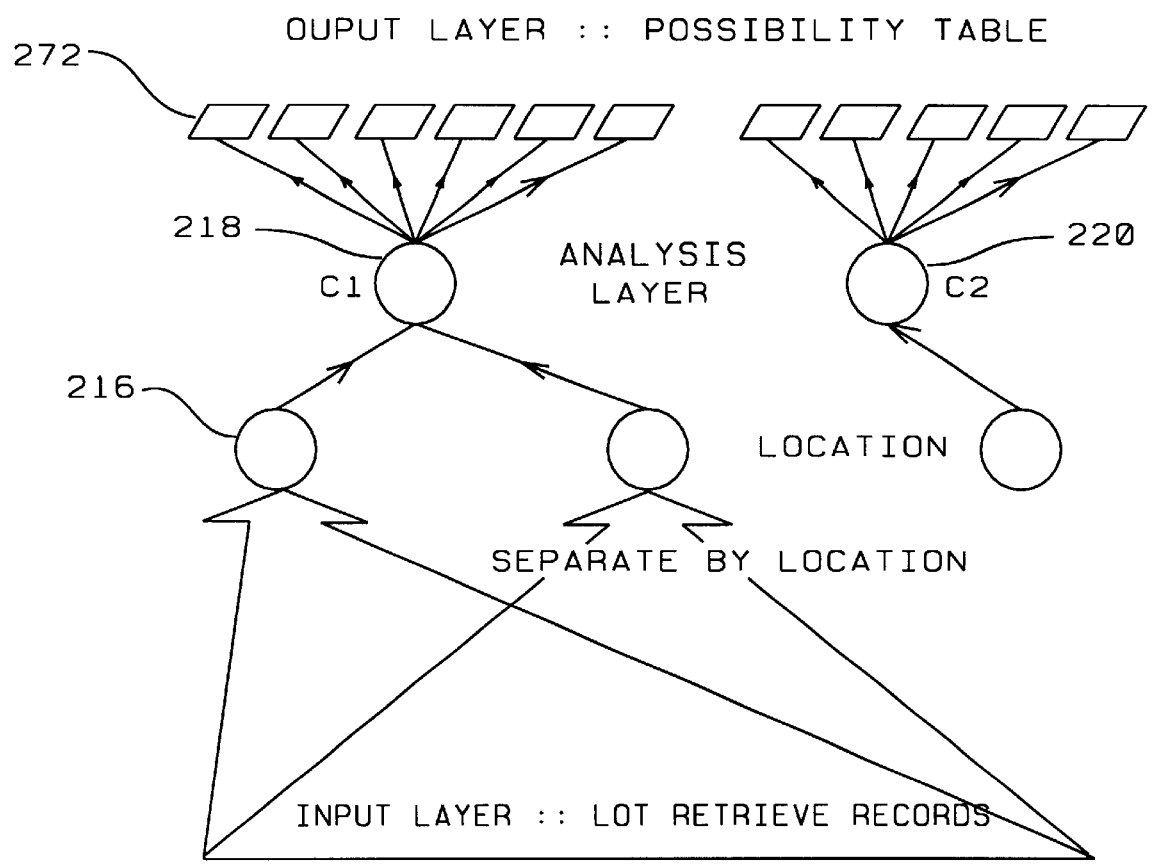
FIG. 2B is a flow diagram of the program script.

The new automated process is a computer program script (also referred to as a stored program) that has the logic to analyze the lot retrieve records 212. This is looked at in more detail in FIG. 2B. A timer 208 periodically produces a trigger 210 that activates the running of the script against the records. Initially, the script runs an SQL procedure to get the significant records defined by manufacturing personnel. Records are separated by location of the stockers 216. Two types of analysis model routines are shown here, C1 and C2 218 220. This is sufficient for most wafer manufacturing environments, though more could be added if needed.

The system will classify lot retrieve records by their location fields for assignment to a particular analysis model routine. The purpose of these analysis model routines is to generate a possibility table 222. This table utilizes processing rules applied to possible lot destinations to arrice at an accurate prediction of the optimum destination.

Figures 3, 4A:
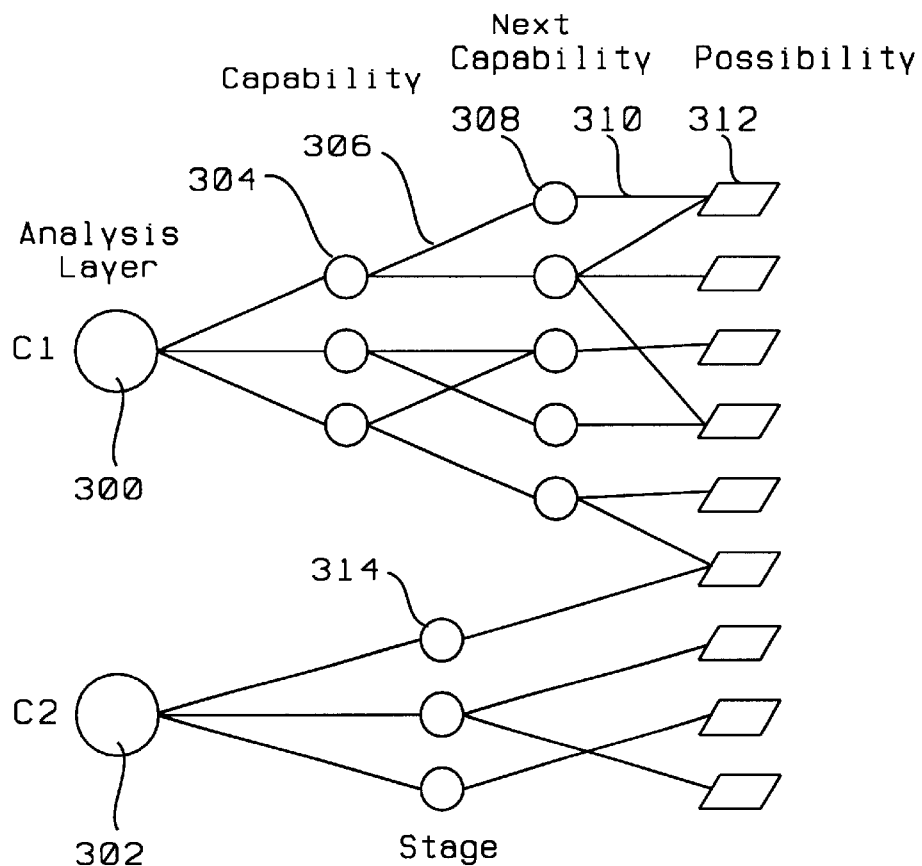
FIG. 3 is a flow diagram of the analysis layer of the method.
FIG. 4A is a table showing example tools and their capabilities.

The analysis model routines C1 and C2 are shown in more detail in FIG. 3. The C1 analysis model layer 300 is for lots requiring multiple step processing. Here the analysis model must check the next capability 304 to ensure that it is operational and not too busy. Choosing the optimum path 306 to the next capability 308 becomes very important when several possible paths to the next capabilities are being considered. The output of this analysis routine is a possibility table 312.

Past history plays an important role in determining an optimum path. The analysis model routine looks at each process step and the next required capability and then calculates the number of times in the past each next capability was correct. Correctness is determined by stocker wait time or need for manual transport to another stocker. The success percentage for each path, or hit rate, is calculated and becomes the possibility value for the path. The AMHS chooses to move the lot to the next capability based on this hit rate. With frequent updating of the possibility table, tool changes or problems can rapidly be reflected.

Though the C1 type of analysis is most frequently used in wafer manufacturing, the C2 type is used by some lines and presents another case scenario. Analysis model routine C2 302 analyzes the lot retrieve records based on stage 314. This is typical for the photo area in wafer manufacturing. Stage is a point in a logical group of process steps. In the photo area, for example, most manufacturing equipment contains the same capability. It would be difficult to analyze as in C1 since all required processing is done by the same tool. Thus, C2 is a simpler analysis. Hit ratios are calculated in the same manner. All paths are added to the possibility table with the AMHS choosing the best path from the history of which stages are working best. In FIGS. 4 we have examples of tables that describe how the hit ratios are determined. In FIG. 4A there are four tools (A, B, C and D) with their associated stockers shown 400. Each tool has various fixed capabilities which are shown (M, N, O, P) 410. Some tools can have multiple capabilities as tools A, C, and D do. In FIG. 4B the table shows the sequential process steps 420 that an example lot will require to be a finished product. Each step has a required process that must be performed, and it requires the capability shown 430.

FIG. 4C is an example of the processing of a work lot going through the Fab line 440 using the requirements defined in FIGS. 4A and 4B. The route 450 the lot is given to the next tool stocker is shown 450. This route is chosen by the AMHS based on a C1 type analysis of the retrieve history records. For process 1 in FIG. 4C the tool chosen is tool A, so the lot is moved to the stocker for tool A with needed capability M. The chosen routes based on the hit ration for that path. This is shown in FIG. 4C in the hit ratio column 460. This percentage is calculated each time the C1 analysis is run from the past history of previously successful and unsuccessful moves to the next capability tool. Unsuccessful moves are those moves that have to be manually rerouted to a tool other than the one chosen. In this case the hit ration is 50%, indicating that in the past it was a successful path half the time. The AMHS chooses the path with the highest success ratio, so in this case it can be predicted that tool A will provide the best chance of success at this time.

Once the first process M is completed, the route to the next process N is determined. In FIG. 4C the route to tool B chosen. This route has a 60% hit ratio at this time, which is the best available. Assuming successful completion at tool B, process 3 which requires the next capability O is moved to the D tool with that capability. The D tool also has the next capability for process step 4, so in this case the lot does not move and is processed there. Having a hit ratio of 85% would mean that 15% of the time the tools could not do that process and the lot had to be manually moved to another tool. The processing is completed. The C1 analysis routine would now have the history of this lot to draw from.

In FIG. 4D another example is shown. Using the same tools and requirements as in FIGS. 4A and 4B, the method is the same. At this time the analysis routine is working with different retrieve records so the paths could be different. Process 1 470 now uses tool D 480 with the current best hit ratio of 95% 490. For process 2 requiring the N capability, the lot is routed to the A tool with a hit ratio of 80%. Again the most successful completion with the needed capability at this time. For process 3 the lot is moved to tool C and for process 4 is moved to tool D based on the fact that the their hit ratios suggest the best chance for success.

It is important to note that the hit ratios are being updated frequently, and that these optimum routes are being chosen at the end of each processing. This dynamic prediction method is the centerpiece of this method. Cost saving results when lots are optimally routed to the correct tool stockers and lost time is reduced. This is a big savings in a Fab line that runs continuously.

The method of the invention provides advantages over the prior art in that it more effectively minimizes the total cycle time in manufacturing. Predicting an optimum path for each lot transmission reduces total time and minimizes the impact changes in processing might have on the entire Fab line by adapting for them quickly.

While the invention has been particularly shown and described with reference to preferred embodiments thereof, it will be understood by those skilled in the art that various changes in form and details may be made without departing from the spirit and scope of the invention.

What is claimed is:

1. An AMHS lot transmission prediction method, comprising the steps of:
   a. providing a process that can predict the optimum transmission path to the next work position;
   b. providing an SQL algorithm that determines the key information records to retrieve for generation of optimized transmission and storage instructions to the AMHS;
   c. retrieving AMHS history records on a continuous basis so as to be able to quickly adapt the system according to recent past behavior;
   d. collecting time stamps, location, stage, tool capability, and next required tool capability of each lot processed in order to adapt the current Fab activity;
   e. running a stored programming procedure that analyzes current activity on the Fab and from that develops the lot distribution table of successful hit ratios for manufacturing transmissions.

2. The AMHS lot transmission prediction method of claim 1, wherein the process can predict a plurality of optimum transmission paths based on retrieved history records in a real time basis.

3. The AMHS lot transmission prediction method of claim 1, wherein the SQL algorithm is a computer-run procedure that sorts the AMHS history records which manufacturing personnel have determined are the most important records for correctly predicting lot transmissions.

4. The AMHS lot transmission prediction method of claim 1, wherein the AMHS retrieved records are analyzed on a continuos basis so that lot transmission predictions done by an analysis routine are in real time and more accurate.

5. The AMHS lot transmission prediction method of claim 1, wherein the AMHS has records containing the time stamp, location, stage, tool capability, and the next required tool capability of each lot processed in order that the needed information is available for an analysis routine.

6. The AMHS lot transmission prediction method of claim 1, wherein the analysis routine is a computer programming script run against the records output from the SQL routine. It determines the best path to transmit a work lot so that manual intervention due to incorrect moves to tools unable to do the work at that time is minimized.

7. A lot transmission prediction method, comprising the steps of:
   a. providing a flow control process that can predict the optimum transmission path for work lots to their next work position;
   b. providing a method that determines the key information records to retrieve for generation of optimized transmission and storage instructions for manufacturing;
   c. retrieving manufacturing history records on a continuous basis in order to quickly adapt the system according to recent past behavior;
   d. collecting the time stamps, location, stage, tool capability, and next required tool capability of each lot processed in order to adapt the current Fab activity;
   e. running a stored programming procedure that analyzes current activity on the Fab and from that develops the lot distribution table of successful hit ratios for manufacturing transmissions.

8. The lot transmission prediction method of claim 7, wherein the process can predict a plurality of optimum transmission paths based on retrieved history records in a real time basis.

9. The lot transmission prediction method of claim 7, wherein the method that determines the key information is a computer-run procedure that sorts the manufacturing history records which manufacturing personnel have determined are the most important records for correctly predicting lot transmission.

10. The lot transmission prediction method of claim 7, wherein the history records are analyzed on a continious basis so that lot transmission predictions done by an analysis routine are in real time and more accurate.

11. The lot transmission prediction method of claim 7, wherein manufacturing personnel have records containing the time stamps, location, stage, tool capability, and the next required tool capability of each lot processed in order that the needed information is available for an analysis routine.

12. The lot transmission prediction method of claim 7, wherein the analysis routine is a computer programming script run against the records defined by manufacturing personnel. It determines the best path to transmit a work lot so that manual intervention due to incorrect moves to tools unable to do the work at that time is minimized.

13. A prediction control system for controlling transmission of work lots in manufacturing comprising of:
   a. an AMHS type system that controls tools and transmission of work lots on the manufacturing floor;
   b. a data processing system that creates records containing the time stamps, location, stage, tool capability, and the next required tool capability of each lot processed;
   c. a set of analysis routines that continuously check past records to predict the optimum transmission path to the next tool so that processing can begin in a timely manner without a manual move by manufacturing personnel;
   d. a feedback procedure that notifies the system of successful and unsuccessful transmissions in real time so that subsequent transmissions have the advantage of this information in determining their optimum path.

14. The prediction control system of claim 13, wherein the AMHS type system is an active data processing system that controls most manufacturing activities on the Fab line.

15. The prediction control system of claim 13, wherein the prediction control is an integral part of the manufacturing control system.

16. The prediction control system of claim 13, wherein the feedback procedure is an integral part of the manufacturing control system.

17. A method of a software transmission prediction system that sorts a plurality of records that represent a plurality of activities monitored by a manufacturing control system so as to produce optimum transmission to the next capable tool by:
   a. storing a plurality of data records in a memory storage device with each record representing a plurality of entities from which a lot distribution table of successful hit ratios is built;

b. identifying a set of data records containing the required information on which to build the lot distribution table of successful hit ratios, and c. providing the lot distribution table of successful hit ratios to the manufacturing control system so that the manufacturing control system can issue an optimized transmission command.

18. The software transmission prediction system of claim 17, wherein data records are a current active history of the work lots being processed by the manufacturing control system.

19. The software transmission prediction system of claim 17, wherein a software routine sorts the records to provide only the significant records needed for use by a analysis program to create the lot distribution table of successful hit ratios.

20. The software transmission prediction system of claim 17, wherein the lot distribution table of successful hit ratios is passed in memory storage to the manufacturing control system.

* * * * *